F. HALL.
PROCESS FOR CONSTRUCTING ENDLESS BELTS AND MOLD THEREFOR.
APPLICATION FILED DEC. 15, 1915.

1,204,976.

Patented Nov. 14, 1916.
2 SHEETS—SHEET 1.

Witness
Alfred G. Seiler

Inventor
F. Hall.
by A. P. Connor,
Attorney

F. HALL.
PROCESS FOR CONSTRUCTING ENDLESS BELTS AND MOLD THEREFOR.
APPLICATION FILED DEC. 15, 1915.
1,204,976.
Patented Nov. 14, 1916.
2 SHEETS—SHEET 2.
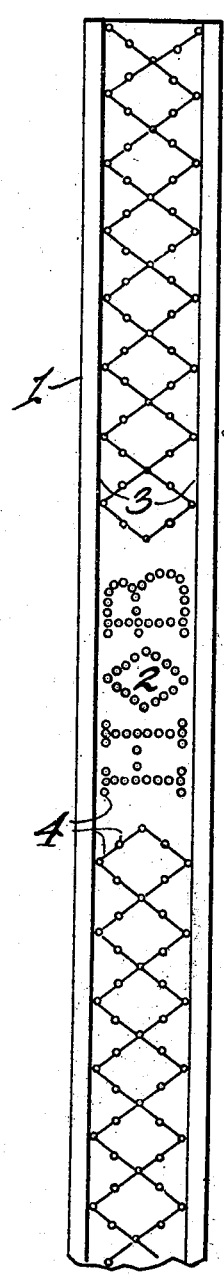
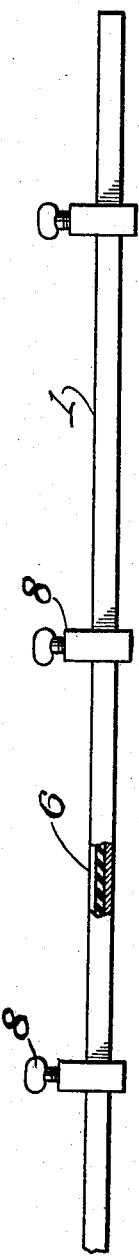
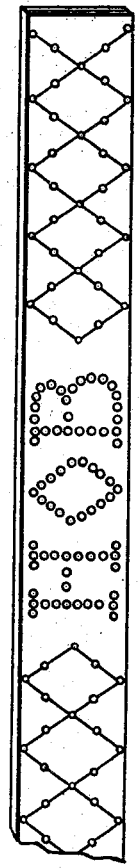
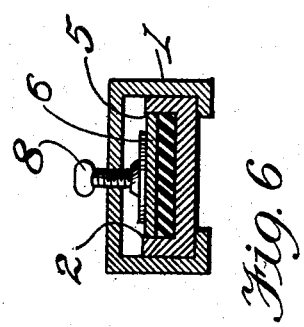

UNITED STATES PATENT OFFICE.

FRED HALL, OF NEWARK, OHIO.

PROCESS FOR CONSTRUCTING ENDLESS BELTS AND MOLD THEREFOR.

1,204,976. Specification of Letters Patent. Patented Nov. 14, 1916.

Application filed December 15, 1915. Serial No. 66,922.

*To all whom it may concern:*

Be it known that I, FRED HALL, a citizen of the United States, residing at Newark, in the county of Licking and State of Ohio, have invented certain new and useful Improvements in Processes for Constructing Endless Belts and Molds Therefor, of which the following is a specification, reference being had to the accompanying drawing.

This invention relates to transmission of power devices and more in particular to arrangements for making and splicing belts for transmission purposes.

Some of the objects of this invention are to provide an arrangement whereby belts may be made endless with facility; the construction of the belt such that it will have a large coefficient of friction whereby slipping will be practically eliminated, to have the belt adapted for use on either of its sides, to provide a belt of exceptional strength, wearing and weathering qualities for the purposes in question, and other objects which will become apparent as the invention is more fully set forth.

This invention is especially adapted for making belts endless without the use of laces and other mechanical means of a like nature, which are in vogue at the present time.

Figure 1:
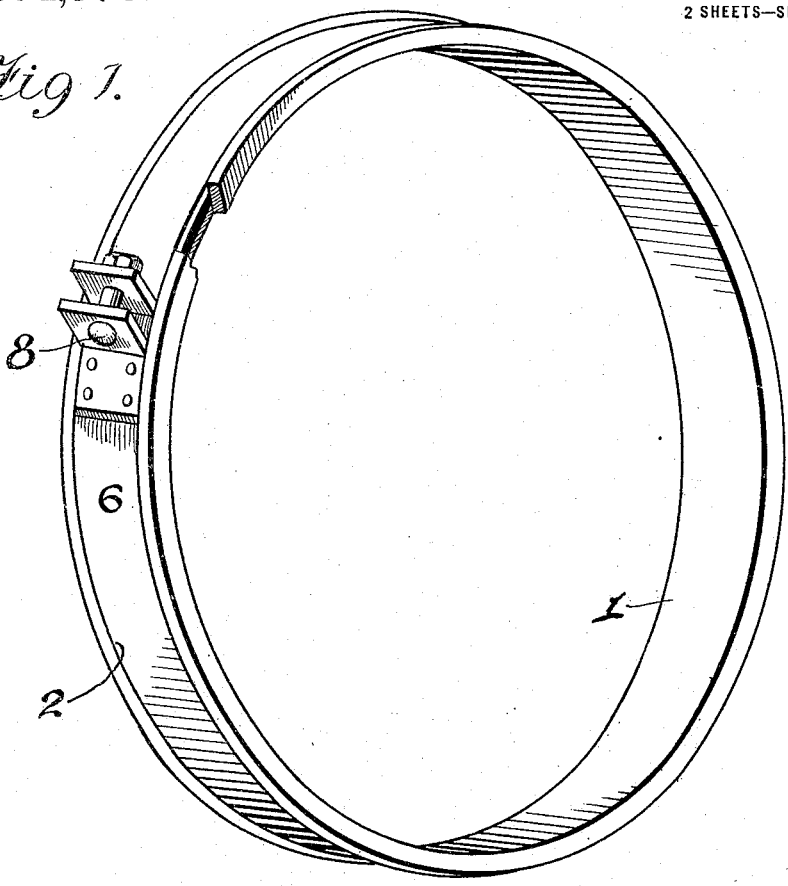
Figure 2:
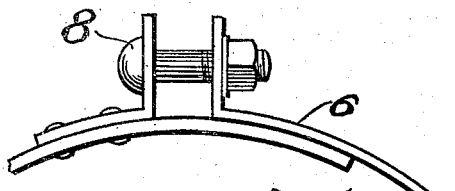
Figure 3:
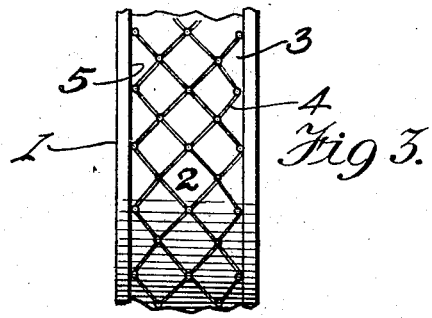
Figure 4:

In the drawings which show by way of example a modification of this invention: Figure 1 shows a mold and belt embodying this invention, in perspective. Fig. 2 is a detail of the clamping means. Fig. 3 is a detail showing corrugations of the mold. Fig. 4 is a plan view, broken away, of a modification. Fig. 5 is a side elevation of Fig. 4. Fig. 6 is a cross-section through the clamp of the modification. Fig. 7 is a detail of a finished belt, and Fig. 8 is a detail of a belt joint. Fig. 9 is a perspective view of the inner or molding side of the clamping plate of the mold.

Similar reference characters refer to similar parts throughout the drawings.

In the construction shown in the drawings, the reference character 1 represents a mold for making splices and for the purpose of a like nature, and which is shown in a ring-like form in Fig. 1. It is provided with a groove 2 adapted to receive belts to be spliced, and the face or bottom 3 of the groove is indented or corrugated with line or punch mark grooves 4 provided for roughening the face of the splice and belt. The sides of the large groove 2 are designated by the character 5.

The pressure medium for the mold consists of a plate 6 also suitably indented or corrugated, as at 7, and is provided with a tightening member 8 for bringing the plate fast and tight with the groove 2 on the belt placed therein. The member is shown in Fig. 1, to consist of a bolt and nut arrangement suitably attached to the plate 6.

The belt for which this mold is intended is preferably constructed of No. 10 duck cloth folded about and covering a strip of No. 18 duck cloth, and treated with a mixture of Ceylon rubber, Emerex, whiting, litharge, crude turpentine and aluminum flake. The outer plate or band 6 is then put into operation and pressure exerted on the portion of the belt within the mold. The mold is put in a steam heater for 15 minutes with pressure at 55 pounds and afterward taken out with the belt the latter then being cured for about 30 minutes. This produces a belt capable of standing a substantial test for strength, and it has high friction-surface which is increased by the indents or corrugations, and the belt may be used on either side. The ingredients of the belt provide a rubber-like construction but one of a much more durable and wearable nature.

While the drawings show a single form of this invention it is not desired to limit the invention to that particular form or in any way otherwise than limited by the prior art, as many constructions of this invention may be made without departing from the principles thereof and coming within the scope of the appended claims.

Having thus described the invention I claim:

1. A process for constructing endless belts consisting in treating a belt with Ceylon rubber, Emerex whiting, litharge, crude turpentine and aluminum flake, and bringing the ends thereof so treated together and exerting pressure with heat making the end portions join integrally with one another.

2. A mold for splicing belting comprising in combination, an annular member having a recess therein arranged to receive belting ends, said recess having indenting or corrugating grooves therein, an annular pressure plate having indenting or corrugating grooves on its inner surface for pressing the belting ends in the recess, and a means for adjusting the pressure of said plate on the belting.

In testimony whereof I hereunto affix my signature in the presence of two witnesses.

FRED HALL.

Witnesses:
 FOWLER HARPER,
 H. C. ASHCROFT.

Copies of this patent may be obtained for five cents each, by addressing the "Commissioner of Patents, Washington, D. C."